US010910651B2

(12) United States Patent
Murase et al.

(10) Patent No.: US 10,910,651 B2
(45) Date of Patent: Feb. 2, 2021

(54) BINDER FOR NON-AQUEOUS SECONDARY BATTERY ELECTRODE, SLURRY FOR NON-AQUEOUS SECONDARY BATTERY ELECTRODE, ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Tomoya Murase, Tokyo (JP); Masahiro Onoe, Tokyo (JP)

(73) Assignee: ZEON CORPORATION, Tokyo (JP)

(*) Notice: Subject to any disclaimer, the term of this patent is extended or adjusted under 35 U.S.C. 154(b) by 23 days.

(21) Appl. No.: 16/079,205

(22) PCT Filed: Mar. 9, 2017

(86) PCT No.: PCT/JP2017/009567
§ 371 (c)(1),
(2) Date: Aug. 23, 2018

(87) PCT Pub. No.: WO2017/155059
PCT Pub. Date: Sep. 14, 2017

(65) Prior Publication Data
US 2019/0097235 A1 Mar. 28, 2019

(30) Foreign Application Priority Data
Mar. 10, 2016 (JP) ................................ 2016-047463

(51) Int. Cl.
H01M 4/62 (2006.01)
H01M 4/13 (2010.01)
C08F 212/00 (2006.01)
C08F 220/12 (2006.01)
H01M 4/04 (2006.01)
C08F 212/10 (2006.01)
H01M 10/0525 (2010.01)
C08F 212/08 (2006.01)
C08F 220/18 (2006.01)
C08F 212/36 (2006.01)

(52) U.S. Cl.
CPC .......... H01M 4/622 (2013.01); C08F 212/00 (2013.01); C08F 212/08 (2013.01); C08F 212/10 (2013.01); C08F 212/36 (2013.01); C08F 220/12 (2013.01); C08F 220/18 (2013.01); H01M 4/0404 (2013.01); H01M 4/13 (2013.01); H01M 10/0525 (2013.01); H01M 4/625 (2013.01)

(58) Field of Classification Search
CPC .... C08F 212/00; C08F 212/08; C08F 212/10; C08F 212/36; C08F 220/12; C08F 220/42; C08F 220/44; C08F 220/18; C08F 220/1804; C08F 220/1805; C08F 220/1806; C08F 220/1807; C08F 220/1808; C08F 220/1809; C08F 220/1811; C08F 220/1812; C08F 220/1818; H01M 4/0404; H01M 4/13; H01M 4/364; H01M 4/622; H01M 4/625; H01M 10/0525
See application file for complete search history.

(56) References Cited

U.S. PATENT DOCUMENTS

| 3,520,953 | A | | 7/1970 | Sugimoto et al. | |
|---|---|---|---|---|---|
| 5,137,979 | A | * | 8/1992 | Maeda | C08F 285/00 525/309 |
| 6,380,315 | B1 | * | 4/2002 | Fischer | C08F 4/00 525/256 |
| 2002/0049265 | A1 | * | 4/2002 | Dreher | C08F 220/18 524/5 |
| 2010/0160190 | A1 | * | 6/2010 | Kuvshinnikova | C08L 55/00 508/117 |
| 2013/0330622 | A1 | | 12/2013 | Sasaki et al. | |

FOREIGN PATENT DOCUMENTS

| CN | 102473917 A | | 5/2012 |
|---|---|---|---|
| JP | 2001332265 A | | 11/2001 |
| JP | 2013145763 A | | 7/2013 |
| WO | 2011001848 A1 | | 1/2011 |
| WO | WO 2012/023626 | * | 2/2012 |
| WO | 2012115096 A1 | | 8/2012 |

OTHER PUBLICATIONS

Machine translation of the abstract of WO 2011/001848, published on Jan. 6, 2011 (Year: 2011).*
Machine translation of the abstract of WO 2012/023626, published on Feb. 23, 2012 (Year: 2012).*
Machine translation of WO 2012/023626, published on Feb. 23, 2012 (Year: 2012).*
Jul. 1, 2019, the Extended European Search Report issued by the European Patent Office in the corresponding European Patent Application No. 177633991.
Sep. 11, 2018, International Preliminary Report on Patentability issued in the International Patent Application No. PCT/JP2017/009567.

* cited by examiner

Primary Examiner — Anca Eoff
(74) Attorney, Agent, or Firm — Kenja IP Law PC

(57) ABSTRACT

Provided is a binder for an electrode that enables production of a slurry for an electrode that has excellent dispersibility and can cause a secondary battery to display excellent output characteristics and high-temperature cycle characteristics. The binder for an electrode contains a polymer and an organic solvent. The polymer includes a structural unit derived from a monofunctional ethylenically unsaturated carboxylic acid ester monomer in a proportion of at least 45 mass % and not more than 69.9 mass %, a structural unit derived from an aromatic vinyl monomer in a proportion of at least 30 mass % and not more than 54.9 mass %, and a structural unit derived from an ethylenically unsaturated nitrile monomer in a proportion of at least 0.1 mass % and not more than 10 mass %.

7 Claims, No Drawings

BINDER FOR NON-AQUEOUS SECONDARY BATTERY ELECTRODE, SLURRY FOR NON-AQUEOUS SECONDARY BATTERY ELECTRODE, ELECTRODE FOR NON-AQUEOUS SECONDARY BATTERY, AND NON-AQUEOUS SECONDARY BATTERY

CROSS-REFERENCE TO RELATED APPLICATIONS

This application claims priority to and the benefit of Japanese Patent Application No. 2016-047463 filed on Mar. 10, 2016, the entire contents of which are incorporated herein by reference.

TECHNICAL FIELD

The present disclosure relates to a binder for a non-aqueous secondary battery electrode, a slurry for a non-aqueous secondary battery electrode, an electrode for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy-density, and the ability to be repeatedly charged and discharged, and are used in a wide variety of applications. Consequently, studies have been made to improve battery members such as electrodes in recent years for the purpose of achieving even higher non-aqueous secondary battery performance.

An electrode for a secondary battery, such as a lithium ion secondary battery, normally includes a current collector and an electrode mixed material layer formed on the current collector. The electrode mixed material layer is formed, for example, through application and drying on the current collector of a slurry for an electrode in which an electrode active material, a conductive material, a binder for an electrode containing a polymer that functions as a binding material, and so forth are dispersed in a dispersion medium.

In recent years, attempts have been made to improve binders for electrodes and slurries for electrodes used in formation of electrode mixed material layers in order to achieve further improvement of secondary battery performance.

For example, PTL 1 discloses a binder for an electrode that contains a polymer having low electrochemical reactivity. The binder for an electrode in PTL 1 is formed from a polymer that includes a structural unit derived from a monofunctional ethylenically unsaturated carboxylic acid ester monomer and a structural unit derived from an ethylenically unsaturated nitrile monomer in specific proportions, but does not substantially include a structural unit derived from an ethylenic hydrocarbon monomer, a structural unit derived from a diene monomer, or a structural unit derived from an ethylenically unsaturated carboxylic acid monomer. By adopting a polymer with a composition such as described above and suppressing electrochemical reactivity of the binder for an electrode to a low level in PTL 1, a lithium ion secondary battery produced using the binder for an electrode is provided with improved charge/discharge cycle characteristics at high temperature.

CITATION LIST

Patent Literature

PTL 1: JP 2001-332265 A

SUMMARY

Technical Problem

In order to further improve performance of secondary batteries, there is demand for improvement of output characteristics in addition to the high-temperature cycle characteristics mentioned above.

However, dispersibility of components such as an electrode active material in a slurry for an electrode produced using the binder for an electrode described in PTL 1 is insufficient, and it has not been possible to sufficiently improve secondary battery output characteristics with this slurry for an electrode.

Consequently, there has been demand for the development of a binder for an electrode that can improve dispersibility of a slurry for an electrode and can also cause a secondary battery to display excellent output characteristics and high-temperature cycle characteristics.

Accordingly, an objective of the present disclosure is to provide a slurry for an electrode that has excellent dispersibility and can cause a secondary battery to display excellent output characteristics and high-temperature cycle characteristics, and to provide a binder for an electrode that enables production of this slurry for an electrode.

Another objective of the present disclosure is to provide a secondary battery having excellent output characteristics and high-temperature cycle characteristics, and an electrode that enables production of this secondary battery.

Solution to Problem

The inventors conducted diligent investigation with the aim of solving the problems set forth above. Through this investigation, the inventors discovered that by using a polymer including specific monomer units in specific proportions as a polymer contained in a binder for an electrode and by using an organic solvent as a solvent for dissolving or dispersing this polymer, a slurry for an electrode having excellent dispersibility can be obtained. The inventors also confirmed that a secondary battery including an electrode formed using this slurry for an electrode displays excellent output characteristics and high-temperature cycle characteristics, and, in this manner, completed the present disclosure.

Specifically, the present disclosure aims to advantageously solve the problems set forth above by disclosing a binder for a non-aqueous secondary battery electrode comprising a polymer and an organic solvent, wherein the polymer includes: a structural unit (a) derived from a monofunctional ethylenically unsaturated carboxylic acid ester monomer in a proportion of at least 45 mass % and not more than 69.9 mass %; a structural unit (b) derived from an aromatic vinyl monomer in a proportion of at least 30 mass % and not more than 54.9 mass %; and a structural unit (c) derived from an ethylenically unsaturated nitrile monomer in a proportion of at least 0.1 mass % and not more than 10 mass %. When a binder for an electrode contains a polymer including structural units derived from specific monomers in specific proportions and an organic solvent as set forth above, a slurry for an electrode produced using the binder for an electrode can be provided with better dispersibility.

Moreover, a secondary battery including an electrode formed using the slurry for an electrode containing this binder for an electrode can be caused to display excellent output characteristics and high-temperature cycle characteristics.

Herein, the term "monofunctional ethylenically unsaturated carboxylic acid ester monomer" refers to a monomer that is a monocarboxylic acid ester including one ethylenically unsaturated bond in individual molecules thereof (for example, an acrylate or a methacrylate).

Moreover, the percentage contents of structural units derived from various monomers can be measured by a nuclear magnetic resonance (NMR) method, such as $^1$H-NMR.

In the presently disclosed binder for a non-aqueous secondary battery electrode, total percentage content of the structural unit (a), the structural unit (b), and the structural unit (c) is preferably 90 mass % or more relative to all structural units included in the polymer. This is preferable because a slurry for an electrode produced using the binder for an electrode can be provided with even better dispersibility when the total proportion of specific structural units included in the polymer contained in the binder for an electrode is at least the lower limit set forth above. This is also preferable because a secondary battery including an electrode formed using the slurry for an electrode containing this binder for an electrode can be provided with even better output characteristics and high-temperature cycle characteristics.

In the presently disclosed binder for a non-aqueous secondary battery electrode, the polymer preferably has a solubility parameter of at least 19.0 MPa$^{1/2}$ and not more than 19.6 MPa$^{1/2}$. This is preferable because a slurry for an electrode produced using the binder for an electrode can be provided with even better dispersibility when the solubility parameter of the polymer contained in the binder for an electrode is within the range set forth above. This is also preferable because a secondary battery including an electrode formed using the slurry for an electrode containing this binder for an electrode can be provided with even better output characteristics and high-temperature cycle characteristics.

The "solubility parameter" (hereinafter, also referred to simply as the "SP value") referred to herein is a value that can be used as an index for evaluating affinity between substances and solubility.

Moreover, the "SP value" is taken to be a value calculated by the Hoy calculation method.

In the presently disclosed binder for a non-aqueous secondary battery electrode, the polymer preferably has a swelling rate in electrolyte solution of at least 100% and not more than 300%. This is preferable because output characteristics and high-temperature cycle characteristics of a produced secondary battery can be further improved when the polymer contained in the binder for an electrode has a swelling rate in electrolyte solution that is within the range set forth above.

The "swelling rate in electrolyte solution" referred to herein can be measured by a measurement method described in the EXAMPLES section of the present specification.

In the presently disclosed binder for a non-aqueous secondary battery electrode, the polymer preferably has a weight average molecular weight of at least 5×10$^4$ and not more than 100×10$^4$. This is preferable because a slurry for an electrode produced using the binder for an electrode can be provided with even better dispersibility when the polymer contained in the binder for an electrode has a weight average molecular weight that is within the range set forth above. This is also preferable because a secondary battery including an electrode formed using the slurry for an electrode containing this binder for an electrode can be provided with even better output characteristics and high-temperature cycle characteristics.

The "weight average molecular weight" referred to herein can be calculated by gel permeation chromatography as a value in terms of polystyrene serving as a standard substance.

Moreover, the present disclosure aims to advantageously solve the problems set forth above by disclosing a slurry for a non-aqueous secondary battery electrode comprising: an electrode active material; and any of the binders for a non-aqueous secondary battery electrode set forth above. Through use of any of the binders for an electrode set forth above, a slurry for an electrode in which components such as an electrode active material are uniformly dispersed can be obtained. As a result, a secondary battery including an electrode formed using the slurry for an electrode can be caused to display excellent output characteristics and high-temperature cycle characteristics.

The presently disclosed slurry for a non-aqueous secondary battery electrode preferably further comprises a conductive material. Through further inclusion of a conductive material in the slurry for an electrode, it is possible to obtain a slurry for an electrode in which components such as the electrode active material and the conductive material are uniformly dispersed. As a result, a secondary battery including an electrode formed using the slurry for an electrode can be caused to display even better output characteristics and high-temperature cycle characteristics.

Also, the present disclosure aims to advantageously solve the problems set forth above by disclosing an electrode for a non-aqueous secondary battery comprising: a current collector; and an electrode mixed material layer formed using any of the slurries for a non-aqueous secondary battery electrode set forth above. An electrode that includes a current collector and the electrode mixed material layer set forth above can cause a secondary battery to display excellent output characteristics and high-temperature cycle characteristics.

Furthermore, the present disclosure aims to advantageously solve the problems set forth above by disclosing a non-aqueous secondary battery comprising a positive electrode, a negative electrode, a separator, and an electrolyte solution, wherein at least one of the positive electrode and the negative electrode is the electrode for a non-aqueous secondary battery set forth above. A secondary battery having excellent output characteristics and high-temperature cycle characteristics can be obtained when at least one of the positive electrode and the negative electrode is the electrode for a non-aqueous secondary battery set forth above.

Advantageous Effect

According to the present disclosure, it is possible to provide a slurry for an electrode that has excellent dispersibility and can cause a secondary battery to display excellent output characteristics and high-temperature cycle characteristics, and to provide a binder for an electrode that enables production of this slurry for an electrode.

Moreover, according to the present disclosure, it is possible to provide a secondary battery having excellent output characteristics and high-temperature cycle characteristics, and an electrode that enables production of this secondary battery.

DETAILED DESCRIPTION

The following provides a detailed description of embodiments of the present disclosure.

A presently disclosed binder for a non-aqueous secondary battery electrode can be used in production of a slurry for an electrode of a non-aqueous secondary battery such as a lithium ion secondary battery (i.e., a slurry for a non-aqueous secondary battery electrode). Moreover, a slurry for a non-aqueous secondary battery electrode produced using the presently disclosed binder for a non-aqueous secondary battery electrode can be used in formation of an electrode included in a non-aqueous secondary battery (i.e., an electrode for a non-aqueous secondary battery).

Note that the presently disclosed binder for a non-aqueous secondary battery electrode and slurry for a non-aqueous secondary battery electrode are particularly suitable for use in formation of a positive electrode of a non-aqueous secondary battery.

(Binder for Non-Aqueous Secondary Battery Electrode)

The presently disclosed binder for a non-aqueous secondary battery electrode contains an organic solvent and a polymer that includes structural units derived from specific monomers that differ from one another (specifically, a structural unit (a) derived from a monofunctional ethylenically unsaturated carboxylic acid ester monomer, a structural unit (b) derived from an aromatic vinyl monomer, and a structural unit (c) derived from an ethylenically unsaturated nitrile monomer) in specific proportions. The polymer included in the presently disclosed binder for a non-aqueous secondary battery electrode may further include structural units derived from other monomers besides the structural units (a), (b), and (c) derived from the specific monomers set forth above. Moreover, the presently disclosed binder for a non-aqueous secondary battery electrode may further contain other components that can be compounded in electrodes of secondary batteries.

As a result of the presently disclosed binder for a non-aqueous secondary battery electrode containing a polymer that includes the structural units (a), (b), and (c) derived from the specific monomers set forth above in specific proportions, it is possible to favorably disperse components contained in a slurry for an electrode, such as an electrode active material, when the presently disclosed binder for a non-aqueous secondary battery electrode is used in production of the slurry for an electrode. Moreover, a secondary battery including an electrode mixed material layer formed using the presently disclosed binder for a non-aqueous secondary battery electrode can be caused to display excellent output characteristics and high-temperature cycle characteristics.

<Polymer>

The polymer includes at least structural units derived from three types of monomers: a structural unit (a) derived from a monofunctional ethylenically unsaturated carboxylic acid ester monomer, a structural unit (b) derived from an aromatic vinyl monomer, and a structural unit (c) derived from an ethylenically unsaturated nitrile monomer. In addition, the polymer may further include structural units derived from other monomers besides the structural units (a), (b), and (c) derived from the aforementioned monomers.

<<Structural Unit (a) Derived from Monofunctional Ethylenically Unsaturated Carboxylic Acid Ester Monomer>>

The polymer is required to include a structural unit (a) derived from a monofunctional ethylenically unsaturated carboxylic acid ester monomer in a specific proportion. Through inclusion of a specific amount of the structural unit (a) in the polymer, excellent dispersibility can be ensured, and an electrode formed using the binder for an electrode containing the polymer can be provided with good flexibility. Consequently, a secondary battery including the electrode can be provided with good output characteristics and high-temperature cycle characteristics.

[Percentage Content of Structural Unit (a)]

The proportion in which the structural unit (a) derived from a monofunctional ethylenically unsaturated carboxylic acid ester monomer is included in the polymer is required to be at least 45 mass % and not more than 69.9 mass % relative to all structural units included in the polymer. Moreover, the percentage content of the structural unit (a) derived from a monofunctional ethylenically unsaturated carboxylic acid ester monomer is preferably 50 mass % or more, and more preferably 55 mass % or more, and is preferably 65 mass % or less, and more preferably 60 mass % or less. When the proportion in which the structural unit (a) is included in the polymer is at least any of the lower limits set forth above, an electrode formed using the binder for an electrode containing the polymer can be provided with good flexibility. Moreover, when the proportion in which the structural unit (a) is included in the polymer is not more than any of the upper limits set forth above, dispersibility of a slurry for an electrode produced using the binder for an electrode can be improved. Consequently, a secondary battery having excellent output characteristics and high-temperature cycle characteristics can be obtained when the proportion in which the structural unit (a) is included in the polymer is within any of the ranges set forth above.

[Type of Monofunctional Ethylenically Unsaturated Carboxylic Acid Ester Monomer]

Specific examples of monofunctional ethylenically unsaturated carboxylic acid ester monomers that may be used to form the structural unit (a) derived from a monofunctional ethylenically unsaturated carboxylic acid ester monomer include, but are not specifically limited to, acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate (for example, 2-ethylhexyl acrylate), nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate (for example, 2-ethylhexyl methacrylate), nonyl methacrylate, decyl methacrylate, lauryl methacrylate, n-tetradecyl methacrylate, and stearyl methacrylate.

One monofunctional ethylenically unsaturated carboxylic acid ester monomer may be used individually, or two or more monofunctional ethylenically unsaturated carboxylic acid ester monomers may be used in combination in a freely selected ratio.

Of these monofunctional ethylenically unsaturated carboxylic acid ester monomers, an acrylic acid alkyl ester in which the alkyl portion bonded to the carboxylic acid ester has a carbon number of 4 or more is preferable from a viewpoint of increasing dispersibility of a slurry for an electrode while providing a formed electrode with good flexibility. Note that the carbon number of the alkyl portion is preferably 18 or less, and more preferably 12 or less.

Specific examples of acrylic acid alkyl esters in which the alkyl portion bonded to the carboxylic acid ester has a carbon number of at least 4 and not more than 12 include n-butyl acrylate, t-butyl acrylate, pentyl acrylate, hexyl acrylate, heptyl acrylate, 2-ethylhexyl acrylate, nonyl acrylate, decyl acrylate, and lauryl acrylate, of which, 2-ethylhexyl acrylate is preferable.

<<Structural Unit (b) Derived from Aromatic Vinyl Monomer>>

The polymer is also required to include a structural unit (b) derived from an aromatic vinyl monomer in a specific proportion. Through inclusion of a specific amount of the structural unit (b) in the polymer, excellent dispersibility can be displayed while ensuring electrolyte solution resistance. Consequently, a secondary battery including the electrode can be provided with good output characteristics and high-temperature cycle characteristics.

[Percentage Content of Structural Unit (b)]

The proportion in which the structural unit (b) derived from an aromatic vinyl monomer is included in the polymer is required to be at least 30 mass % and not more than 54.9 mass % relative to all structural units included in the polymer. Moreover, the percentage content of the structural unit (b) derived from an aromatic vinyl monomer is preferably 32 mass % or more, and more preferably 35 mass % or more, and is preferably 45 mass % or less, and more preferably 40 mass % or less. When the proportion in which the structural unit (b) is included in the polymer is at least any of the lower limits set forth above, components in a slurry for an electrode, such as an electrode active material, can be sufficiently dispersed when the binder for an electrode containing the polymer is used in production of the slurry. In general, the structural unit (b) displays high adsorptivity with respect to conductive materials, and particularly with respect to conductive materials formed from carbon materials. Consequently, in a case in which a slurry for an electrode contains a conductive material, the conductive material can also be favorably dispersed in the slurry when the proportion in which the structural unit (b) is included in the polymer is at least any of the lower limits set forth above. Moreover, a secondary battery including an electrode formed using this slurry displays excellent output characteristics and high-temperature cycling. Moreover, when the proportion in which the structural unit (b) is included in the polymer is not more than any of the upper limits set forth above, electrode flexibility can be sufficiently increased. Consequently, a secondary battery having excellent output characteristics and high-temperature cycle characteristics can be obtained.

[Type of Aromatic Vinyl Monomer]

Specific examples of aromatic vinyl monomers that may be used to form the structural unit (b) derived from an aromatic vinyl monomer include, but are not specifically limited to, styrene, α-methylstyrene, vinyltoluene, and divinylbenzene. Of these aromatic vinyl monomers, aromatic monovinyl monomers such as styrene, α-methylstyrene, and vinyltoluene are preferable, and styrene is more preferable from a viewpoint of increasing dispersibility of a produced slurry for an electrode. One aromatic vinyl monomer may be used individually, or two or more aromatic vinyl monomers may be used in combination in a freely selected ratio.

<<Structural Unit (c) Derived from Ethylenically Unsaturated Nitrile Monomer>>

The polymer is also required to include a structural unit (c) derived from an ethylenically unsaturated nitrile monomer in a specific proportion. Through inclusion of a specific amount of the structural unit (c) in the polymer, it is possible to restrict the swelling rate in electrolyte solution of the polymer from becoming excessively high while also causing an electrode containing the polymer to display excellent binding capacity. Consequently, a secondary battery including an electrode formed using the binder for an electrode containing the polymer can be provided with good output characteristics and high-temperature cycle characteristics.

[Percentage Content of Structural Unit (c)]

The proportion in which the structural unit (c) derived from an ethylenically unsaturated nitrile monomer is included in the polymer is required to be at least 0.1 mass % and not more than 10 mass % relative to all structural units included in the polymer. Moreover, the percentage content of the structural unit (c) derived from an ethylenically unsaturated nitrile monomer is preferably 2.5 mass % or more, and is preferably 7.5 mass % or less. When the proportion in which the structural unit (c) is included in the polymer is at least any of the lower limits set forth above, binding capacity of an electrode containing the polymer can be increased, and thus a secondary battery having excellent high-temperature cycle characteristics can be obtained. In addition, when the proportion in which the structural unit (c) is included in the polymer is at least any of the lower limits set forth above, the polymer can favorably dissolve in the organic solvent used therewith (i.e., the percentage of insoluble content of the polymer in the organic solvent can be reduced). As a result, when a slurry for an electrode containing the polymer is produced, aggregation of components in the slurry for an electrode, such as an electrode active material and a conductive material, can be prevented, and good dispersibility of the slurry for an electrode can be maintained, which can inhibit deterioration of output characteristics and high-temperature cycle characteristics of a produced secondary battery. Moreover, when the proportion in which the structural unit (c) is included in the polymer is not more than any of the upper limits set forth above, it is possible to inhibit an excessive rise in the degree of swelling of the polymer in an electrolyte solution (swelling rate in electrolyte solution). Consequently, when an electrode mixed material layer formed using a slurry for an electrode containing the polymer is immersed in electrolyte solution, it is possible to inhibit increase in separation of components contained in the electrode mixed material layer, such as an electrode active material and a conductive material, and particularly of the conductive material, and to inhibit change in structure of the formed electrode mixed material layer, and thus good secondary battery output characteristics and high-temperature cycle characteristics can be maintained.

[Type of Ethylenically Unsaturated Nitrile Monomer]

Specific examples of ethylenically unsaturated nitrile monomers that may be used to form the structural unit (c) derived from an ethylenically unsaturated nitrile monomer include, but are not specifically limited to, acrylonitrile, methacrylonitrile, α-chloroacrylonitrile, and α-ethylacrylonitrile. One ethylenically unsaturated nitrile monomer may be used individually, or two or more ethylenically unsaturated nitrile monomers may be used in combination in a freely selected ratio.

Of these ethylenically unsaturated nitrile monomers, acrylonitrile and methacrylonitrile are preferable, and acrylonitrile is more preferable from a viewpoint of providing the polymer with good binding capacity.

<<Structural Units Derived from Other Monomers>>

In addition to the structural unit (a), the structural unit (b), and the structural unit (c) set forth above, the polymer may further include structural units derived from monomers other than those of the structural unit (a), the structural unit (b), and the structural unit (c).

Examples of structural units derived from other monomers include, but are not specifically limited to, a structural unit derived from an ethylenic hydrocarbon monomer, a structural unit derived from a diene monomer such as a conjugated diene monomer, a structural unit derived from an ethylenically unsaturated carboxylic acid monomer, a structural unit derived from a sulfonate group or phosphate group-containing monomer, a structural unit derived from an ethylenically unsaturated carboxylic acid amide monomer, and a structural unit derived from a polyfunctional ethylenically unsaturated carboxylic acid ester monomer.

Examples of ethylenic hydrocarbon monomers that may be used to form the structural unit derived from an ethylenic hydrocarbon monomer include ethylene and propylene.

Examples of diene monomers that may be used to form the structural unit derived from a diene monomer include 1,3-butadiene, 2-methyl-1,3-butadiene, 2,3-dimethyl-1,3-butadiene, 2-chloro-1,3-butadiene, substituted linear conjugated pentadienes, and substituted and branched conjugated hexadienes.

Examples of ethylenically unsaturated carboxylic acid monomers that may be used to form the structural unit derived from an ethylenically unsaturated carboxylic acid monomer include acrylic acid, methacrylic acid, allyl methacrylate, crotonic acid, 2-ethylacrylic acid, isocrotonic acid, maleic acid, fumaric acid, itaconic acid, methylmaleic acid, dimethylmaleic acid, phenylmaleic acid, chloromaleic acid, dichloromaleic acid, fluoromaleic acid, maleic acid esters such as methyl allyl maleate, diphenyl maleate, nonyl maleate, decyl maleate, dodecyl maleate, octadecyl maleate, and fluoroalkyl maleate, maleic anhydride, acrylic anhydride, methylmaleic anhydride, dimethylmaleic anhydride, monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfonate group or phosphate group-containing monomers that may be used to form the structural unit derived from a sulfonate group or phosphate group-containing monomer include vinyl sulfonic acid, methyl vinyl sulfonic acid, allyl sulfonic acid, methallyl sulfonic acid, acrylic acid-2-ethyl sulfonate, methacrylic acid-2-ethyl sulfonate, 2-acrylamido-2-methylpropanesulfonic acid, 3-allyloxy-2-hydroxypropanesulfonic acid, and the like; and 2-acryloyloxyethyl phosphate, 2-methacryloyloxyethyl phosphate, methyl-2-acryloyloxyethyl phosphate, methyl-2-methacryloyloxyethyl phosphate, ethyl-acryloyloxyethyl phosphate, ethyl-methacryloyloxyethyl phosphate, and the like.

Examples of ethylenically unsaturated carboxylic acid amide monomers that may be used to form the structural unit derived from an ethylenically unsaturated carboxylic acid amide monomer include acrylamide, methacrylamide, N-methylolacrylamide, N-methylolmethacrylamide, and N,N-dimethylacrylamide.

Examples of polyfunctional ethylenically unsaturated carboxylic acid ester monomers that may be used to form the structural unit derived from a polyfunctional ethylenically unsaturated carboxylic acid ester monomer include dimethacrylic acid esters such as ethylene glycol dimethacrylate and diethylene glycol dimethacrylate; trimethacrylic acid esters such as trimethylolpropane trimethacrylate; diacrylic acid esters such as polyethylene glycol diacrylate and 1,3-butylene glycol diacrylate; triacrylic acid esters such as trimethylolpropane triacrylate; polyalkylene glycol dimethacrylates such as triethylene glycol dimethacrylate, tetraethylene glycol dimethacrylate, pentaethylene glycol dimethacrylate, hexaethylene glycol dimethacrylate, heptaethylene glycol dimethacrylate, octaethylene glycol dimethacrylate, tripropylene glycol dimethacrylate, tetrapropylene glycol dimethacrylate, pentapropylene glycol dimethacrylate, hexapropylene glycol dimethacrylate, heptapropylene glycol dimethacrylate, and octapropylene glycol dimethacrylate, and compounds in which at least a portion of methacrylate in any of the preceding examples is changed to acrylate; and polyalkylene glycol acrylates such as triethylene glycol diacrylate, tetraethylene glycol diacrylate, pentaethylene glycol diacrylate, hexaethylene glycol diacrylate, heptaethylene glycol diacrylate, octaethylene glycol diacrylate, tripropylene glycol diacrylate, tetrapropylene glycol diacrylate, pentapropylene glycol diacrylate, hexapropylene glycol diacrylate, heptapropylene glycol diacrylate, and octapropylene glycol diacrylate.

One of these other monomers may be used individually, or two or more of these other monomers may be used in combination in a freely selected ratio.

<<Total Percentage Content of (a), (b), and (c)>>

The total percentage content of the structural unit (a) derived from a monofunctional ethylenically unsaturated carboxylic acid ester monomer, the structural unit (b) derived from an aromatic vinyl monomer, and the structural unit (c) derived from an ethylenically unsaturated nitrile monomer set forth above relative to 100 mass % of all structural units included in the polymer is preferably 90 mass % or more, more preferably 96 mass % or more, even more preferably 99.6 mass % or more, and further preferably 100 mass %. In other words, the percentage content of optionally included structural units derived from monomers other than those of the structural unit (a), the structural unit (b), and the structural unit (c) set forth above is preferably 10 mass % or less, more preferably 4 mass % or less, even more preferably 0.4 mass % or less, and further preferably 0 mass %. Thus, it is preferable that the polymer is composed mainly of the structural unit (a), the structural unit (b), and the structural unit (c) and does not substantially include structural units derived from other monomers, and further preferable that the polymer is composed only of the structural unit (a), the structural unit (b), and the structural unit (c) and does not include structural units derived from other monomers at all.

This is preferable because by setting the total proportion in which the structural unit (a), the structural unit (b), and the structural unit (c) are included in the polymer as at least any of the lower limits set forth above, the proportion in which structural units derived from other monomers are included in the polymer can be restricted, which can inhibit increase in the swelling rate in electrolyte solution of the polymer and further improve output characteristics and high-temperature cycle characteristics of a produced secondary battery.

In the present specification, when the polymer is said to "not substantially include" structural units derived from other monomers, this means that the total percentage content of structural units derived from other monomers is 10 mass % or less relative to 100 mass % of all structural units included in the polymer.

Of the structural units derived from other monomers set forth above, it is preferable that, in particular, a structural unit derived from a diene monomer and a structural unit derived from an ethylenically unsaturated carboxylic acid monomer are not substantially included in the polymer from a viewpoint of restricting the proportion of structural units derived from other monomers and improving performance of the obtained polymer, slurry for an electrode, secondary battery, and so forth.

The percentage content of a structural unit derived from a diene monomer in the polymer relative to 100 mass % of all structural units included in the polymer is preferably 10 mass % or less, more preferably 4 mass % or less, and even more preferably 0 mass % (i.e., a structural unit derived from a diene monomer is even more preferably not included). One reason for this is that, if the percentage content of a structural unit derived from a diene monomer in the polymer exceeds any of the upper limits set forth above, the polymer may decompose and degrade in an electrode due to the structural unit derived from a diene monomer, which has high electrochemical reactivity, and this may cause deterioration of secondary battery high-temperature cycle characteristics. Another reason is that a structural unit derived from a diene monomer increases the swelling rate in electrolyte solution of the polymer and causes deterioration of secondary battery output characteristics and high-temperature cycle characteristics.

Moreover, the percentage content of a structural unit derived from an ethylenically unsaturated carboxylic acid monomer in the polymer relative to 100 mass % of all structural units included in the polymer is preferably 1 mass % or less, more preferably 0.4 mass % or less, and even more preferably 0 mass % (i.e., a structural unit derived from an ethylenically unsaturated carboxylic acid monomer is even more preferably not included). One reason for this is that, if the percentage content of a structural unit derived from an ethylenically unsaturated carboxylic acid monomer in the polymer exceeds any of the upper limits set forth above, the structural unit derived from an ethylenically unsaturated carboxylic acid monomer impedes adsorption of the polymer to an electrode active material, conductive material, or the like in a slurry for an electrode, and thereby causes deterioration of dispersibility of the slurry for an electrode. Another reason is that, as a result, output characteristics and high-temperature cycle characteristics deteriorate in a secondary battery including an electrode formed using this slurry.

<<Solubility Parameter (SP Value)>>

The solubility parameter of the polymer ($SP_p$ value) as calculated by the subsequently described Hoy calculation method is preferably 19.0 $MPa^{1/2}$ or more, more preferably 19.1 $MPa^{1/2}$ or more, and even more preferably 19.2 $MPa^{1/2}$ or more, and is preferably 19.6 $MPa^{1/2}$ or less, more preferably 19.4 $MPa^{1/2}$ or less, and even more preferably 19.3 $MPa^{1/2}$ or less. One reason for this is that when the $SP_p$ value is at least any of the lower limits set forth above, the polymer favorably dissolves in the organic solvent that is present therewith in the binder for an electrode, which can provide a slurry for an electrode produced using the binder for an electrode with better dispersibility. Another reason is that, as a result, output characteristics and high-temperature cycle characteristics of a produced secondary battery are improved. Moreover, another reason is that when the $SP_p$ value is not more than any of the upper limits set forth above, an excessive rise in the swelling rate in electrolyte solution of the polymer can be inhibited, and excellent output characteristics and high-temperature cycle characteristics of a produced secondary battery can be maintained.

Herein, the solubility parameter is calculated by the Hoy calculation method. In the Hoy calculation method, an SP value is first calculated with respect to a homopolymer of each of the structural units (a), (b), (c), and so forth. The SP value is then calculated by multiplying the SP value obtained for each homopolymer by the percentage content (molar percentage) of each monomer included in the copolymer formed from different types of monomers.

Note that the $SP_p$ value of the polymer can be controlled without any specific limitations by, for example, adjusting the amounts of the monomers forming the polymer in production of the polymer, and particularly the amount of the ethylenically unsaturated nitrile monomer.

<<Swelling Rate in Electrolyte Solution>>

The swelling rate in electrolyte solution of the polymer is preferably 300% or less, more preferably less than 250%, and even more preferably less than 200%, and is normally 100% or more. One reason for this is that when the swelling rate in electrolyte solution of the polymer is not more than any of the upper limits set forth above, excessive swelling of an electrode mixed material layer in contact with electrolyte solution inside a secondary battery can be inhibited, an increase in separation of an electrode active material, separation of a conductive material, and separation between the electrode active material and the conductive material contained in the electrode mixed material layer can be inhibited, and change in structure of the formed electrode mixed material layer can be inhibited. Another reason is that, as a result, output characteristics and high-temperature cycle characteristics can favorably be maintained in a produced secondary battery.

Note that the swelling rate in electrolyte solution of the polymer can be controlled without any specific limitations by, for example, adjusting the amounts of the monomers forming the polymer in production of the polymer, and particularly the amount of the ethylenic ally unsaturated nitrile monomer.

<<Weight Average Molecular Weight>>

The weight average molecular weight of the polymer is preferably $5 \times 10^4$ or more, more preferably $7.5 \times 10^4$ or more, and even more preferably $10 \times 10^4$ or more, and is preferably $100 \times 10^4$ or less, more preferably $75 \times 10^4$ or less, and even more preferably $50 \times 10^4$ or less. When the weight average molecular weight of the polymer is at least any of the lower limits set forth above, binding capacity of the polymer can be improved, and binding capacity of an electrode formed using a slurry for an electrode that contains the polymer can be further improved. As a result, a secondary battery that maintains excellent high-temperature cycle characteristics even upon repeated use can be obtained. Moreover, when the weight average molecular weight of the polymer is not more than any of the upper limits set forth above, dispersibility of a slurry for an electrode produced using the polymer can be further improved, and output characteristics and high-temperature cycle characteristics of a produced secondary battery can be further improved.

<<Glass Transition Temperature>>

The glass transition temperature of the polymer is preferably −60° C. or higher, and is preferably 0° C. or lower, more preferably −5° C. or lower, and even more preferably −10° C. or lower. One reason for this is that the binder for an electrode containing the polymer, a slurry for an electrode containing the binder, and an electrode formed using the slurry can easily be obtained when the glass transition temperature of the polymer is at least the lower limit set forth above. Another reason is that flexibility of a formed electrode can be further increased when the glass transition temperature of the polymer is not higher than any of the upper limits set forth above.

<<Percentage of Insoluble Content>>

The solubility of the polymer in the aforementioned organic solvent can be evaluated, for example, through the percentage of insoluble content of the polymer contained in the binder for an electrode with respect to the organic solvent (=weight of polymer that does not dissolve in organic solvent/weight of overall polymer×100(%)). The percentage of insoluble content of the polymer with respect to the organic solvent is preferably less than 50%, more preferably less than 30%, and even more preferably less than 10%. One reason for this is that when the percentage of insoluble content of the polymer with respect to the organic solvent is less than any of the upper limits set forth above, the polymer favorably dissolves in the organic solvent in the binder for an electrode, and this can prevent aggregation of components such as an electrode active material and a conductive material in a slurry for an electrode that is produced using the binder, and enables a slurry for an electrode having further improved dispersibility to be obtained. Another reason is that, as a result, output characteristics and high-temperature cycle characteristics of a produced secondary battery can be further improved.

The "percentage of insoluble content" referred to herein can be measured by the "Measurement method of polymer solubility" described in the EXAMPLES section of the present specification.

Note that the percentage of insoluble content of the polymer can be controlled without any specific limitations by, for example, adjusting the amounts of the monomers forming the polymer in production of the polymer, and particularly the amount of the ethylenic ally unsaturated nitrile monomer.

<<Production Method of Polymer>>

No specific limitations are placed on the mode of polymerization of the polymer. For example, any of solution polymerization, suspension polymerization, bulk polymerization, and emulsion polymerization may be used. Moreover, the polymerization reaction may be addition polymerization such as ionic polymerization, radical polymerization, or living radical polymerization. Furthermore, a polymerization initiator, emulsifier, dispersant, polymerization aid, or the like used in polymerization may be the same as typically used and the amount thereof may also be the same as typically used.

<Organic Solvent>

The presently disclosed binder for a non-aqueous secondary battery electrode contains an organic solvent in addition to the polymer set forth above.

Examples of organic solvents that may be used include, but are not specifically limited to, alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide organic solvents such as N,N-dimethylformamide and N-methylpyrrolidone (NMP); and aromatic hydrocarbons such as toluene, xylene, chlorobenzene, ortho-dichlorobenzene, and para-dichlorobenzene. Of these organic solvents, polar organic solvents such as NMP are preferable.

One of these solvents may be used individually, or two or more of these solvents may be used as a mixture. In a case in which a polymer produced in water is used, the water used in production of the polymer may be removed before mixing with the organic solvent or may be removed by evaporation after a water dispersion of the polymer has been mixed with the organic solvent.

<<Solubility Parameter (SP Value)>>

From a viewpoint of favorably dissolving the polymer in the organic solvent, the solubility parameter ($SP_s$ value) of the organic solvent is preferably a value such that an absolute value $|SP_p-SP_s|$ of the difference between the solubility parameter ($SP_s$) of the organic solvent and the solubility parameter ($SP_p$) of the polymer is 2.7 or less. This is because good solubility of the polymer in the organic solvent can be ensured, dispersibility of a produced slurry for an electrode can be further improved, and output characteristics and high-temperature cycle characteristics of a produced secondary battery can be further improved when $|SP_p-SP_s|$ is not more than the upper limit set forth above.

<Other Components>

In addition to the polymer and organic solvent set forth above, the binder for a non-aqueous secondary battery electrode may further contain components other than the polymer and the organic solvent. Examples of other components that may be further contained in the binder include, but are not specifically limited to, surface tension modifiers, thickeners, reinforcing materials, additives for electrolyte solution, and dispersants. These other components are not specifically limited so long as they do not affect the battery reactions and may be selected from commonly known components such as those described in WO 2012/115096 A1. One of these components may be used individually, or two or more of these components may be used in combination in a freely selected ratio.

(Slurry for Non-Aqueous Secondary Battery Electrode)

The presently disclosed slurry for a non-aqueous secondary battery electrode contains an electrode active material and the binder for a non-aqueous secondary battery electrode set forth above, and may optionally further contain a conductive material and other components. In other words, the presently disclosed slurry for a non-aqueous secondary battery electrode normally contains an electrode active material, the polymer set forth above, and an organic solvent, and may optionally further contain a conductive material and other components. Moreover, it is preferable that the presently disclosed slurry for a non-aqueous secondary battery electrode further contains a conductive material. As a result of the presently disclosed slurry for an aqueous secondary battery electrode containing the binder for a non-aqueous secondary battery electrode set forth above, components such as the electrode active material and the optional conductive material are uniformly dispersed. Consequently, when the presently disclosed slurry for an aqueous secondary battery electrode is used to form an electrode mixed material layer of an electrode, components such as the electrode active material and the optional conductive material can also be uniformly dispersed in the electrode mixed material layer. Moreover, an electrode having excellent electrolyte solution resistance, flexibility, and binding capacity (peel strength) can be obtained through use of the slurry for a non-aqueous secondary battery electrode containing the polymer set forth above, which contains specific structural units in specific proportions. Consequently, a non-aqueous secondary battery can be caused to display excellent battery characteristics, and particularly output characteristics and high-temperature cycle characteristics through use of this electrode.

Although the following describes, as one example, a case in which the slurry for a non-aqueous secondary battery electrode is a slurry for a lithium ion secondary battery positive electrode, the presently disclosed slurry for a non-aqueous secondary battery electrode is not limited to the following example.

<Electrode Active Material (Positive Electrode Active Material)>

The electrode active material is a substance that accepts and donates electrons in an electrode of a secondary battery. In the case of an electrode active material for a lithium ion secondary battery, a substance that occludes and releases lithium is normally used.

Examples of positive electrode active materials that may be used include, but are not specifically limited to, known positive electrode active materials such as lithium-containing cobalt oxide ($LiCoO_2$), lithium manganate ($LiMn_2O_4$), lithium-containing nickel oxide ($LiNiO_2$), lithium-containing composite oxide of Co—Mn—Ni ($Li(Co\ Mn\ Ni)O_2$), lithium-containing composite oxide of Ni—Mn—Al, lithium-containing composite oxide of Co—Ni—Al ($Li(Co\ Ni\ Al)O_2$), olivine-type lithium iron phosphate ($LiFePO_4$), olivine-type manganese lithium phosphate ($LiMnPO_4$), $Li_2MnO_3$—$LiNiO_2$-based solid solution, lithium-rich spinel compounds represented by $Li_{1+x}Mn_{2-x}O_4$ ($0<x<2$), $Li[Ni_{0.17}Li_{0.2}Co_{0.07}Mn_{0.56}]O_2$, and $LiNi_{0.5}Mn_{1.5}O_4$. Of these positive electrode active materials, $LiCoO_2$, $LiNiO_2$, $Li(Co\ Mn\ Ni)O_2$, $Li(Co\ Ni\ Al)O_2$, $Li[Ni_{0.17}Li_{0.2}Co_{0.07}Mn_{0.56}]O_2$, and $LiNi_{0.5}Mn_{1.5}O_4$ are preferable, and $LiCoO_2$, $Li(Co\ Mn\ Ni)O_2$, $Li(Co\ Ni\ Al)O_2$, $Li[Ni_{0.17}Li_{0.2}Co_{0.07}Mn_{0.56}]O_2$, and $LiNi_{0.5}Mn_{1.5}O_4$ are more preferable from a viewpoint of favorably accepting and donating electrons.

The compounded amount and particle diameter of the positive electrode active material are not specifically limited and may be the same as those of a conventionally used positive electrode active material.

<Conductive Material>

Examples of the conductive material, which is an optional component, include, but are not specifically limited to, conductive carbon materials such as carbon black (for example, acetylene black, Ketjenblack® (Ketjenblack is a registered trademark in Japan, other countries, or both), and furnace black), single-walled and multi-walled carbon nanotubes (multi-walled carbon nanotubes are inclusive of cup-stacked carbon nanotubes), carbon nanohorns, vapor-grown carbon fiber, milled carbon fiber obtained through pyrolysis and subsequent pulverization of polymer fiber, graphite, single-layer and multi-layer graphene, and carbon nonwoven fabric sheet obtained through pyrolysis of nonwoven fabric made from polymer fiber; and fibers and foils of various metals. One of these conductive materials may be used individually, or two or more of these conductive materials may be used in combination. Of these conductive materials, conductive carbon materials such as carbon black are preferable in terms of having excellent chemical stability, and acetylene black, Ketjenblack, and single-walled and multi-walled carbon nanotubes are more preferable from a viewpoint of forming a stable conduction path while achieving electron transfer with high efficiency and exhibiting excellent conductivity.

The amount of the conductive material that is compounded in the slurry for an electrode per 100 parts by mass of the electrode active material set forth above is preferably 0.5 parts by mass or more, and more preferably 1 part by mass or more, and is preferably 3 parts by mass or less, and more preferably 2.5 parts by mass or less. One reason for this is that a better conduction path can be formed in an electrode mixed material layer and secondary battery output characteristics can be further improved when the amount of the conductive material in the slurry for an electrode is at least any of the lower limits set forth above. Another reason is that dispersibility of the slurry for an electrode can be more sufficiently improved and good secondary battery output characteristics and high-temperature cycle characteristics can be ensured when the amount of the conductive material in the slurry for an electrode is not more than any of the upper limits set forth above.

<Binder for Electrode>

The binder for an electrode may be the presently disclosed binder for a non-aqueous secondary battery electrode set forth above.

The amount of the binder for an electrode that is compounded per 100 parts by mass of the electrode active material set forth above is preferably 0.01 parts by mass or more, more preferably 0.1 parts by mass or more, and even more preferably 0.15 parts by mass or more, and is preferably 3 parts by mass or less, more preferably 2.5 parts by mass or less, and even more preferably 2 parts by mass or less. One reason for this is that dispersibility of the slurry for an electrode, electrolyte solution resistance, flexibility, and binding capacity of an electrode, and output characteristics and high-temperature cycle characteristics of a secondary battery can be further improved when the amount of the binder in the slurry for an electrode is at least any of the lower limits set forth above. Another reason is that a rise in battery resistance caused by excessive compounding of the binder can be inhibited when the amount of the binder in the slurry for an electrode is not more than any of the upper limits set forth above.

<Solvent>

Examples of solvents that may be compounded in the slurry for a non-aqueous secondary battery electrode include, but are not specifically limited to, the same solvents as may be used as the organic solvent contained in the presently disclosed binder for a non-aqueous secondary battery electrode.

<Other Components>

Examples of other components that may be compounded in the slurry for a non-aqueous secondary battery electrode include, but are not specifically limited to, the same other components as may be compounded in the presently disclosed binder for a non-aqueous secondary battery electrode set forth above and binding materials other than the polymer contained in the presently disclosed binder for a non-aqueous secondary battery electrode (for example, polyvinylidene fluoride, polyacrylonitrile, and polyacrylate).

<Production Method of Slurry for Electrode>

The slurry for a non-aqueous secondary battery electrode can be produced by dispersing or dissolving the above-described components in organic solvent while further adding optional organic solvent as necessary.

Specifically, the slurry for an electrode can be produced by mixing the above-described components and the organic solvent using a mixer such as a ball mill, a sand mill, a bead mill, a pigment disperser, a grinding machine, an ultrasonic disperser, a homogenizer, a planetary mixer, or a FILMIX. Mixing of the above-described components and the organic solvent may normally be performed for a period of from 10 minutes to several hours in a temperature range of from room temperature (23° C.) to 80° C. The organic solvent used in production of the slurry for an electrode may be any of the organic solvents that may be used as the organic solvent contained in the presently disclosed binder for a non-aqueous secondary battery electrode.

(Electrode for Non-Aqueous Secondary Battery)

The presently disclosed electrode for a non-aqueous secondary battery includes a current collector and an electrode mixed material layer formed using the presently disclosed slurry for a non-aqueous secondary battery electrode, and normally has a structure in which the electrode mixed material layer is formed on the current collector. The electrode mixed material layer contains at least an electrode active material and the polymer set forth above, and preferably further contains a conductive material. Note that components contained in the electrode mixed material layer are components that were contained in the slurry for a non-aqueous secondary battery electrode set forth above, and the preferred ratio of these components in the electrode mixed material layer is the same as the preferred ratio of these components in the slurry for an electrode.

The presently disclosed electrode for a non-aqueous secondary battery can display excellent electrolyte solution resistance, flexibility, and binding capacity as a result of including an electrode mixed material layer that is formed using a slurry for an electrode containing the presently disclosed binder for a non-aqueous secondary battery electrode. Moreover, since the presently disclosed electrode for a non-aqueous secondary battery is formed, for example, through application and drying of the slurry for an electrode containing the presently disclosed binder for a non-aqueous secondary battery electrode, the presently disclosed electrode for a non-aqueous secondary battery has a structure in which the electrode active material and the optional conductive material are uniformly dispersed in the electrode mixed material layer after formation thereof. Consequently, a secondary battery having excellent battery characteristics, and particularly output characteristics and high-temperature cycle characteristics can be obtained when the presently disclosed electrode for a non-aqueous secondary battery is used in secondary battery production.

Although the following describes, as one example, a case in which the electrode for a non-aqueous secondary battery is a positive electrode for a lithium ion secondary battery, the presently disclosed electrode for a non-aqueous secondary battery is not limited to the following example.

<Current Collector>

The current collector is a material having electrical conductivity and electrochemical durability. Specifically, the current collector may, for example, be made of a metal material such as iron, copper, aluminum, nickel, stainless steel, titanium, tantalum, gold, or platinum. One of the aforementioned materials may be used individually, or two or more of the aforementioned materials may be used in combination in a freely selected ratio. Of these examples, a thin film made from aluminum is preferable as a current collector used in production of a positive electrode.

<Electrode Mixed Material Layer (Positive Electrode Mixed Material Layer)>

The positive electrode mixed material layer is formed, for example, through a step of applying the slurry for a non-aqueous secondary battery electrode set forth above (application step) and a step of drying the applied slurry for a non-aqueous secondary battery electrode (drying step).

<<Application Step>>

The method by which the previously described slurry for a non-aqueous secondary battery electrode is applied onto the current collector, for example, may be any commonly known method without any specific limitations. Specific examples of application methods that can be used include doctor blading, dip coating, reverse roll coating, direct roll coating, gravure coating, extrusion coating, and brush coating. During application, the slurry for an electrode may be applied onto one side or both sides of the current collector. The thickness of the slurry coating on the current collector after application but before drying may be set as appropriate in accordance with the thickness of the electrode mixed material layer to be obtained after drying.

<<Drying Step>>

The slurry for an electrode that has been applied onto the current collector may be dried by any commonly known method without any specific limitations. Examples of drying methods that can be used include drying by warm, hot, or low-humidity air; drying in a vacuum; and drying by irradiation with infrared light, an electron beam, or the like. When the slurry for an electrode that has been applied onto the current collector is dried in this manner, an electrode mixed material layer can be formed on the current collector, and an electrode including the current collector and the electrode mixed material layer can be obtained.

After the drying step, the electrode mixed material layer may be further subjected to a pressing process, such as mold pressing or roll pressing. The pressing process can improve binding capacity of the electrode mixed material layer and the current collector. Furthermore, in a situation in which the electrode mixed material layer contains a curable polymer, the polymer is preferably cured after formation of the electrode mixed material layer.

(Non-Aqueous Secondary Battery)

The presently disclosed non-aqueous secondary battery includes a positive electrode, a negative electrode, a separator, and an electrolyte solution, wherein at least one of the positive electrode and the negative electrode is the presently disclosed electrode for a non-aqueous secondary battery set forth above. In other words, the presently disclosed non-aqueous secondary battery may include a positive electrode that is the presently disclosed electrode for a non-aqueous secondary battery and a negative electrode that is a known negative electrode, may include a negative electrode that is the presently disclosed electrode for a non-aqueous secondary battery and a positive electrode that is a known positive electrode, or may include a positive electrode and a negative electrode that are each the presently disclosed electrode for a non-aqueous secondary battery. Of the above examples, the presently disclosed non-aqueous secondary battery is preferably a non-aqueous secondary battery in which at least the positive electrode is the presently disclosed electrode for a non-aqueous secondary battery, and is more preferably a non-aqueous secondary battery in which only the positive electrode is the presently disclosed electrode for a non-aqueous secondary battery.

The presently disclosed non-aqueous secondary battery has excellent output characteristics and high-temperature cycle characteristics, and good life characteristics as a result of including the presently disclosed electrode for a non-aqueous secondary battery.

Although the following describes, as one example, a case in which the secondary battery is a lithium ion secondary battery, the presently disclosed secondary battery is not limited to the following example.

<Positive Electrode>

The positive electrode may be the presently disclosed electrode for a non-aqueous secondary battery set forth above but is not specifically limited thereto. In other words, the positive electrode may include an electrode mixed material layer formed using the presently disclosed slurry for a non-aqueous secondary battery electrode and, for example, the previously described current collector. Moreover, in a case in which the presently disclosed electrode for a non-aqueous secondary battery is not used for the positive electrode, the positive electrode may be a known positive electrode. Examples of known positive electrodes that may be used include those described in JP 2013-145763 A.

<Negative Electrode>

The negative electrode may be the presently disclosed electrode for a non-aqueous secondary battery set forth above but is not specifically limited thereto. In other words, the negative electrode may include an electrode mixed material layer formed using the presently disclosed slurry for a non-aqueous secondary battery electrode and any current collector. Moreover, in a case in which the presently disclosed electrode for a non-aqueous secondary battery is not used for the negative electrode, the negative electrode may be a known negative electrode such as a negative electrode formed from a thin plate of metal or a negative electrode including a current collector and a negative electrode mixed material layer formed on the current collector. The negative electrode mixed material layer normally contains a negative electrode active material and a binding material, and may optionally further contain other components such as thickeners and conductive materials. The current collector, the negative electrode active material, the binding material, the dispersion medium, the method by which the negative electrode mixed material layer is formed on the current collector, and so forth may, for example, be any of those described in JP 2013-145763 A.

<Separator>

Examples of separators that may be used include, but are not specifically limited to, a microporous membrane in which a polyolefinic (polyethylene, polypropylene, polybutene, or polyvinyl chloride) resin is used, a microporous membrane in which a resin of polyethylene terephthalate, polycycloolefin, polyether sulfone, polyamide, polyimide, polyimide-amide, polyaramid, polycycloolefin, nylon, polytetrafluoroethylene, or the like is used, woven or nonwoven fabric in which polyolefinic fiber is used, and an assembly of particles formed from an insulating substance. Of these separators, a microporous membrane in which a polyolefinic (polyethylene, polypropylene, polybutene, or polyvinyl chloride) resin is used is preferred because such a membrane can reduce the total thickness of the separator, which increases the ratio of electrode active material in the non-aqueous secondary battery, and consequently increases the capacity per volume. In particular, a microporous membrane formed from a polypropylene resin is more preferable.

<Electrolyte Solution>

Although no specific limitations are placed on the electrolyte solution, the electrolyte solution is normally an organic electrolyte solution obtained by dissolving a supporting electrolyte in a non-aqueous organic solvent. The supporting electrolyte may, for example, be a lithium salt. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable and $LiPF_6$ is particularly preferable as these lithium salts readily dissolve in a solvent and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Suitable examples of organic solvents that may be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used.

Moreover, a known additive such as vinylene carbonate (VC), fluoroethylene carbonate (FEC), or ethyl methyl sulfone may be added to the electrolyte solution.

<Assembly Step>

The presently disclosed non-aqueous secondary battery can be produced by a known assembly method without any specific limitations. Specifically, the presently disclosed non-aqueous secondary battery may be produced by, for example, performing rolling, folding, or the like of the negative electrode, the positive electrode, and the separator obtained as described above in accordance with the battery shape as required, placing these battery members in a battery container, injecting the electrolyte solution into the battery container, and sealing the battery container. In order to prevent pressure increase inside the non-aqueous secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

Note that battery members included in the secondary battery, such as the positive electrode, the negative electrode, and the separator, are normally positioned such that the positive electrode is in contact with one side of the separator and the negative electrode is in contact with the other side of the separator. More specifically, the positive electrode mixed material layer-side of the positive electrode is positioned at one side of the separator and the negative electrode mixed material layer-side of the negative electrode is positioned at the other side of the separator such as to each be in contact with the separator.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used to calculate, measure, and evaluate the percentage content of each structural unit included in a polymer, the swelling rate in electrolyte solution of a polymer, the weight average molecular weight of a polymer, the glass transition temperature of a polymer, the percentage of insoluble content of a polymer, the dispersibility of a slurry for an electrode, the flexibility of an electrode, the binding capacity of an electrode, the output characteristics of a secondary battery, and the high-temperature cycle characteristics of a secondary battery.

<Percentage Content of Each Structural Unit>

An obtained water dispersion of a polymer was coagulated using methanol and was then vacuum dried for 12 hours in an environment having a temperature of 60° C. to obtain a measurement sample in the form of a film. The percentage content (mass %) of each of a structural unit (a) derived from a monofunctional ethylenically unsaturated carboxylic acid ester monomer, a structural unit (b) derived from an aromatic vinyl monomer, a structural unit (c) derived from an ethylenically unsaturated nitrile monomer, and structural units derived from other monomers was measured by $^1$H-NMR. The measured values are shown in Table 1.

<Swelling Rate in Electrolyte Solution of Polymer>

An obtained 8 mass % NMP solution of a polymer was poured into a Teflon® (Teflon is a registered trademark in Japan, other countries, or both) petri dish and was then dried to prepare a polymer film having a thickness of 100 μm after drying. The obtained polymer film was punched out to a size of 16 mm in diameter, and the weight A of the punched-out polymer film was measured. Next, the punched-out polymer film was immersed in 20 mL of a non-aqueous electrolyte solution and was stored for 72 hours in an environment having a temperature of 60° C. Thereafter, the immersed and stored polymer film was removed from the non-aqueous electrolyte solution, and the weight B thereof was measured after non-aqueous electrolyte solution attached to the surface of the polymer film had been sufficiently wiped off. The measured weights A and B were used to calculate the swelling rate in electrolyte solution of the polymer (=B/A× 100(%)). Note that the non-aqueous electrolyte solution was a mixed liquid of $LiPF_6$ of 1 M in concentration used as an electrolyte and ethylene carbonate (EC)/ethyl methyl carbonate (EMC) in a mass ratio of 3/7 used as a solvent with 2 volume % of vinylene carbonate (VC) added thereto. A lower swelling rate in electrolyte solution (i.e., closer to 100%) indicates that the polymer has low tendency to swell in electrolyte solution. The results are shown in Table 1.

A: Swelling rate in electrolyte solution of at least 100% and less than 200%

B: Swelling rate in electrolyte solution of at least 200% and less than 250%

C: Swelling rate in electrolyte solution of at least 250% and not more than 300%

D: Swelling rate in electrolyte solution of more than 300%

<Weight Average Molecular Weight of Polymer>

The weight average molecular weight of a polymer was measured by gel permeation chromatography (GPC). Specifically, a tetrahydrofuran (THF) solution of the polymer that had been adjusted to a solid content of 0.3 mass % was used as a measurement sample. The weight average molecular weight was then calculated as a value in terms of a standard substance (value in terms of polystyrene) by preparing a calibration curve using the standard substance. The measurement conditions were as follows. The results are shown in Table 1.

Apparatus: Gel permeation chromatograph (High-performance GPC apparatus "HLC-8220GPC" produced by Tosoh Corporation)

Column: TSK guardcolumn SuperH-H and TSK gel SuperHM-H (product names) produced by Tosoh Corporation Mobile phase: THF
Flow rate: 0.6 mL/min
Injection volume: 20 μL
Temperature: 40° C.
Detector: Differential refractive index (RI) detector
Standard substance: Standard polystyrene <Glass Transition Temperature of Polymer>

The glass transition temperature of a polymer was measured using a differential scanning calorimeter (produced by SII NanoTechnology Inc.; product name: EXSTAR DSC6220). Specifically, water was evaporated from an obtained water dispersion of the polymer to obtain a polymer sample in the form of a film. Next, 10 mg of the polymer sample was placed in an aluminum pan as a measurement sample. Moreover, an empty aluminum pan was used as a reference substance. Next, the measurement sample was loaded into the differential scanning calorimeter and was measured in a temperature range of −100° C. to 200° C. (heating rate 10° C./min) to obtain a differential scanning calorimetry (DSC) curve. The glass transition temperature (° C.) was determined as a temperature corresponding to an intersection point of a base line of the obtained DSC curve straight before a heat absorption peak for which the derivative signal (DDSC) was 0.05 mW/min/mg or more and a tangent to the DSC curve at a first inflection point to appear after the heat absorption peak. The results are shown in Table 1.

<Percentage of Insoluble Content of Polymer>

An obtained 8 mass % NMP solution of a polymer was poured into a Teflon petri dish and was then dried to prepare a polymer film having a thickness of 100 μm after drying. The obtained polymer film was punched out to a size of 16 mm in diameter, and the weight A of the punched-out polymer film was measured. Next, the punched-out polymer film was immersed in 20 mL of NMP solution and was stored for 72 hours in an environment having a temperature of 60° C. Thereafter, the NMP solution used in immersion and storage was filtered through an 80-mesh sieve (sieve weight taken to be "B"), and the residue was dried. Next, the weight C of the sieve with the dried residue was measured. The measured weights A, B, and C were used to calculate the percentage of insoluble content of the polymer in organic solvent NMP (={(C−B)/A}×100(%)). A lower percentage of insoluble content indicates that the polymer has high solubility in NMP solution. The results are shown in Table 1.

A: Percentage of insoluble content of less than 10%

B: Percentage of insoluble content of at least 10% and less than 30%

C: Percentage of insoluble content of at least 30% and less than 50%

D: Percentage of insoluble content of 50% or more

<Dispersibility of Slurry for Electrode>

The viscosity η0 of an obtained slurry for an electrode was measured using a B-type viscometer (produced by Toki Sangyo Co., Ltd.; product name: TVB-10; rotation speed: 60 rpm). Next, the slurry that had been subjected to viscosity measurement was stirred for 24 hours using a planetary mixer (rotation speed: 60 rpm). The viscosity η1 of the slurry after this stirring was measured using the same B-type viscometer as described above (rotation speed: 60 rpm). The viscosity maintenance rate Δη of the slurry for an electrode from before to after stirring (Δη=η1/η0×100(%)) was calculated, and dispersibility of the slurry for an electrode was evaluated by the following standard. Note that the temperature during viscosity measurement was 25° C. As shown below, a viscosity maintenance rate Δη of closer to 100% indicates that the slurry for an electrode has excellent viscosity stability and that components in the slurry for an electrode can be maintained in a favorably dispersed state without aggregation. The results are shown in Table 1.

A: Viscosity maintenance rate Δη of at least 90% and not more than 110%

B: Viscosity maintenance rate Δη of at least 80% and less than 90%

C: Viscosity maintenance rate Δη of at least 70% and less than 80%

D: Viscosity maintenance rate Δη of less than 70% or more than 110%

<Flexibility of Electrode>

An obtained post-pressing positive electrode for a lithium ion secondary battery was cut to a rectangular shape of 1.0 cm in width×10 cm in length to prepare a specimen. Stainless steel rods of 1 mm to 6 mm in diameter having thicknesses differing by increments of 1 mm were prepared. Next, the specimen was wound around the stainless steel rods in order starting from the stainless steel rod having the largest diameter. Note that a positive electrode mixed material layer had been formed at both an inner side and an outer side of the wound specimen. The electrode mixed material layer at the outer surface of the specimen that had been wound around the stainless steel rod was inspected using a microscope. Flexibility of the electrode was evaluated based on the following standard using the diameter of a stainless steel rod used in a case in which the occurrence of an external appearance defect such as a crack was confirmed. A smaller diameter for the stainless steel rod used when occurrence of an external appearance defect is confirmed indicates that the electrode has high flexibility. The results are shown in Table 1.

A: Diameter of less than 2 mm
B: Diameter of at least 2 mm and less than 4 mm
C: Diameter of at least 4 mm and less than 6 mm
D: Diameter of 6 mm or more <Binding Capacity of Electrode>

An obtained post-pressing positive electrode for a lithium ion secondary battery was cut to a rectangular shape of 1.0 cm in width×10 cm in length to prepare a specimen. Cellophane tape was then attached to the surface of the positive electrode mixed material layer of the specimen. Tape prescribed by JIS Z1522 was used as the cellophane tape. Thereafter, with the cellophane tape in a fixed state to a test bed, a positive electrode mixed material layer-side of the specimen that was not fixed to the test bed was peeled from one end toward the other end at a speed of 50 mm/min, and the stress during this peeling was measured. The same measurement was performed 10 times, and then the average value of the measured stress was taken to be the peel strength (N/m) and was evaluated by the following standard. Higher peel strength indicates excellent binding capacity of an electrode mixed material layer with respect to a current collector. The results are shown in Table 1.

A: Peel strength of 50 N/m or more
B: Peel strength of at least 30 N/m and less than 50 N/m
C: Peel strength of at least 10 N/m and less than 30 N/m
D: Peel strength of less than 10 N/m <Output Characteristics>

Ten obtained pouch lithium ion secondary batteries were prepared. Each of the ten secondary batteries was subjected to a first charge/discharge cycle in which charging was performed to 4.4 V by a 0.2C constant current and discharging was performed to 3.0 V by a 0.2C constant current at a temperature of 25° C., and the discharge capacity $R1$ of the secondary battery was measured. Each of the ten secondary batteries that had been subjected to the first charge/discharge cycle was subjected to a second charge/discharge cycle in which charging was performed to 4.2 V by a 0.2C constant current and discharging was performed to 3.0 V by a 1.0C constant current at a temperature of 25° C., and the discharge capacity $R2$ of the secondary battery was measured. The discharge capacity $R2$ as a proportion of the discharge capacity $R1$ was calculated as a charge/discharge rate characteristic (= $R2/R1 \times 100(\%)$), and an average value of the charge/discharge rate characteristic for the 10 batteries was evaluated based on the following standard as an output characteristic at normal temperature. A large average value for the charge/discharge rate characteristic indicates that internal resistance of the secondary battery is low, and that high-speed charging and discharging is possible, and thus indicates excellent output characteristics. The results are shown in Table 1.

A: Charge/discharge rate characteristic average value of 90% or more
B: Charge/discharge rate characteristic average value of at least 85% and less than 90%
C: Charge/discharge rate characteristic average value of at least 80% and less than 85%
D: Charge/discharge rate characteristic average value of less than 80%

<High-Temperature Cycle Characteristics>

Ten pouch lithium ion secondary batteries that had been evaluated in terms of output characteristics as described above were each subjected to one cycle of an operation of charging to a battery voltage of 4.4 V by a 1C constant current and discharging to a battery voltage of 3 V by a 1C constant current in an environment having a temperature of 45° C. The discharge capacity $RI$ in the first cycle was measured. Next, the operation described above was repeated for 100 cycles, in total. The discharge capacity $R'100$ in the $100^{th}$ cycle was measured. The measured discharge capacity $R'100$ as a proportion of the measured discharge capacity $RI$ was calculated as the charge/discharge capacity retention rate (=$R'100/R1 \times 100(\%)$). An average value of the charge/discharge capacity retention rate for the ten batteries was evaluated based on the following standard as a high-temperature cycle characteristic. A larger average value for the charge/discharge capacity retention rate indicates that the secondary battery has excellent high-temperature cycle characteristics and good life characteristics. The results are shown in Table 1.

A: Charge/discharge capacity retention rate average value of 80% or more
B: Charge/discharge capacity retention rate average value of at least 75% and less than 80%
C: Charge/discharge capacity retention rate average value of at least 70% and less than 75%
D: Charge/discharge capacity retention rate average value of less than 70%

Example 1

<Production of Polymer>

A mixture for a binder was obtained by charging 164 parts by mass of deionized water, 57 parts of 2-ethylhexyl acrylate (2-EHA) as a monofunctional ethylenically unsaturated carboxylic acid ester monomer, 38 parts of styrene (ST) as an aromatic vinyl monomer, 5 parts of acrylonitrile (AN) as an ethylenically unsaturated nitrile monomer, 0.3 parts of potassium persulfate as a polymerization initiator, and 1.2 parts of sodium polyoxyethylene alkyl ether sulfate as an emulsifier to an autoclave equipped with as stirrer. The obtained mixture for a binder was sufficiently stirred, and polymerization was subsequently carried out under heating for 3 hours in an environment having a temperature of 80° C. and then for 2 hours in an environment having a temperature of 80° C. to obtain a water dispersion of a polymer including a structural unit (a) derived from the monofunctional ethylenically unsaturated carboxylic acid ester monomer, a structural unit (b) derived from the aromatic vinyl monomer, and a structural unit (c) derived from the ethylenically unsaturated nitrile monomer. The polymerization conversion rate was calculated to be 96% from the solid content concentration.

The obtained water dispersion of the polymer was used in measurement of the proportion of each structural unit included in the polymer, the weight average molecular weight of the polymer, and the glass transition temperature of the polymer in accordance with the previously described methods. The results are shown in Table 1.

Next, 500 parts of N-methylpyrrolidone (NMP) solution was added as an organic solvent per 100 parts of the obtained water dispersion of the polymer, water and residual monomer were completely evaporated under reduced pressure, and 81 parts of NMP solution was further evaporated to obtain an 8 mass % NMP solution of the polymer.

The obtained 8 mass % NMP solution of the polymer was used in measurement and evaluation of the swelling rate in electrolyte solution of the polymer and the percentage of insoluble content of the polymer in accordance with the previously described methods. Note that the percentage of insoluble content of the polymer in NMP solution was 4%. The results are shown in Table 1.

<Production of Slurry for Positive Electrode>

A planetary mixer was charged with 100 parts of lithium cobalt oxide ($LiCoO_2$; volume average particle diameter: 12 µm) as a positive electrode active material, 1.5 parts of Ketjenblack (produced by Lion Corporation; product name: Special Oil Furnace Carbon Powder EC300J; number average particle diameter: 40 nm; specific surface area: 800 $m^2/g$) as a conductive material, 1.2 parts in terms of solid content of the 8 mass % NMP solution of the polymer obtained as described above, and a suitable amount of NMP solution. Next, the resultant mixture was stirred until the viscosity measured by a B-type viscometer (produced by Toki Sangyo Co., Ltd.; product name: TVB-10; rotation speed: 60 rpm; temperature: 25° C.) reached 5000±200 mPa·s to produce a slurry for a lithium ion secondary battery positive electrode. The obtained slurry for a positive electrode had a solid content concentration of 78 mass % and a viscosity of 4900 mPa·s.

The obtained slurry for a positive electrode was used in measurement and evaluation of the viscosity stability of the slurry for an electrode in accordance with the previously described method. The results are shown in Table 1.

<Formation of Positive Electrode>

Aluminum foil of 15 µm in thickness was prepared as a current collector. Next, the slurry for a lithium ion secondary battery positive electrode was applied onto both sides of the aluminum foil such that the applied amount after drying of the slurry was 20 mg/$cm^2$. The slurry for a lithium ion secondary battery positive electrode was dried for 20 minutes in an environment having a temperature of 60° C. and then for 20 minutes in an environment having a temperature of 120° C. Thereafter, heat treatment was performed for 2 hours in an environment having a temperature of 150° C. to obtain a positive electrode web. The obtained positive electrode web was rolled by roll pressing to shape a sheet that was then cut to 4.8 cm in width×50 cm in length to obtain a post-pressing positive electrode for a lithium ion secondary battery in which a positive electrode mixed material layer of 3.7 g/$cm^3$ in density had been formed on both sides of a current collector formed from the aluminum foil.

The obtained positive electrode was used in calculation and evaluation of flexibility of the electrode and binding capacity of the electrode in accordance with the previously described methods. The results are shown in Table 1.

<Production of Slurry for Negative Electrode>

A planetary mixer was charged with a mixture of 90 parts of spherical artificial graphite (volume average particle diameter: 12 µm) and 10 parts of silicon oxide ($SiO_x$; volume average particle diameter: 10 µm) as a negative electrode active material, 1 part of a styrene-butadiene copolymer as a binding material, 1 part of carboxymethyl cellulose as a thickener, and an appropriate amount of water as a dispersion medium. The obtained mixture was stirred to produce a slurry for a lithium ion secondary battery negative electrode.

The styrene-butadiene copolymer used as a binding material was produced as follows.

<<Production of Styrene-Butadiene Copolymer>>

A 5 MPa pressure vessel equipped with a stirrer was charged with 33 parts of 1,3-butadiene, 3.5 parts of itaconic acid, and 63.5 parts of styrene as monomers, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The reaction was terminated by cooling at the point at which the polymerization conversion rate reached 96% to yield a mixture containing a styrene-butadiene copolymer. The obtained mixture was adjusted to pH 8 through addition of 5% sodium hydroxide aqueous solution and was then subjected to thermal-vacuum distillation to remove unreacted monomers. The mixture was subsequently cooled to 30° C. or lower to obtain a water dispersion of the styrene-butadiene copolymer.

<Formation of Negative Electrode>

Copper foil of 15 µm in thickness was prepared as a current collector. Next, the slurry for a lithium ion secondary battery negative electrode obtained as described above was applied onto both sides of the copper foil such that the applied amount after drying of the slurry was 10 mg/$cm^2$. The slurry for a lithium ion secondary battery negative electrode was dried for 20 minutes in an environment having a temperature of 60° C. and then for 20 minutes in an environment having a temperature of 120° C. Thereafter, heat treatment was performed for 2 hours in an environment having a temperature of 150° C. to obtain a negative electrode web. The obtained negative electrode web was rolled by roll pressing to shape a sheet that was then cut to 5.0 cm in width×52 cm in length to obtain a post-pressing negative electrode for a lithium ion secondary battery in which a negative electrode mixed material layer of 1.8 g/$cm^3$ in density had been formed on both sides of a current collector formed from the copper foil <Assembly of Secondary Battery>

The post-pressing positive electrode for a lithium ion secondary battery and the post-pressing negative electrode for a lithium ion secondary battery produced as described above were arranged with a separator (microporous membrane of 20 µm in thickness made from polypropylene) in-between in the order: separator/positive electrode/separator/negative electrode, to thereby obtain a laminate. Next, the laminate of the electrodes and the separator was wound around a core of 20 mm in diameter to obtain a roll including the positive electrode, the separator, and the negative electrode. The obtained roll was then compressed to a thickness of 4.5 mm from one direction at a rate of 10 mm/s to obtain a flat product. The flat product had an elliptical shape in plan-view, and the ratio of the major and minor axes thereof (major axis/minor axis) was 7.7.

A non-aqueous electrolyte solution (electrolyte: $LiPF_6$ solution of 1.0 M in concentration; solvent: mixed solvent of ethylene carbonate (EC)/ethyl methyl carbonate (EMC)=3/7 (mass ratio) to which 2 volume % of vinylene carbonate (VC) was further added as an additive) was separately prepared as an electrolyte solution.

Next, the flat product was housed in a laminate case made from aluminum with 3.2 g of the non-aqueous electrolyte solution. A negative electrode lead and a positive electrode lead were connected at specific locations, and then an opening of the laminate case was closed by heating. In this manner, a pouch lithium ion secondary battery was produced as a non-aqueous secondary battery. The obtained secondary battery was in the form of a pouch of 35 mm in width×48 mm in height×5 mm in thickness, and had a nominal capacity of 700 mAh.

The obtained pouch lithium ion secondary battery was used in measurement and evaluation of output characteristics and high-temperature cycle characteristics in accordance with the previously described methods. The results are shown in Table 1.

Example 2

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, the amount of 2-ethylhexyl acrylate was changed to 62 parts and the amount of styrene was changed to 33 parts. Moreover, measurements and evaluations were carried out in the same way as in Example 1. The results are shown in Table 1.

Example 3

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, the amount of 2-ethylhexyl acrylate was changed to 52 parts and the amount of styrene was changed 43 parts. Moreover, measurements and evaluations were carried out in the same way as in Example 1. The results are shown in Table 1.

Example 4

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, 0.2 parts of t-dodecyl mercaptan (TDM) was added as a chain transfer agent and the weight average molecular weight of the polymer was adjusted to a value shown in Table 1. Moreover, measurements and evaluations were carried out in the same way as in Example 1. The results are shown in Table 1.

Example 5

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, the amount of 2-ethylhexyl acrylate was changed to 56.9 parts, 0.1 parts of allyl methacrylate was added as another monomer, and the weight average molecular weight of the polymer was adjusted to a value shown in Table 1. Moreover, measurements and evaluations were carried out in the same way as in Example 1. The results are shown in Table 1.

Example 6

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, the amount of 2-ethylhexyl acrylate was changed to 67 parts, the amount of styrene was changed to 30 parts, and the amount of acrylonitrile was changed to 3 parts. Moreover, measurements and evaluations were carried out in the same way as in Example 1. The results are shown in Table 1.

Example 7

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, the amount of 2-ethylhexyl acrylate was changed to 47 parts and the amount of styrene was changed to 48 parts. Moreover, measurements and evaluations were carried out in the same way as in Example 1. The results are shown in Table 1.

Example 8

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, the amount of 2-ethylhexyl acrylate was changed to 59 parts, the amount of styrene was changed to 39.5 parts, and the amount of acrylonitrile was changed to 1.5 parts. Moreover, measurements and evaluations were carried out in the same way as in Example 1. The results are shown in Table 1.

Example 9

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, the amount of 2-ethylhexyl acrylate was changed to 55 parts, the amount of styrene was changed to 36 parts, and the amount of acrylonitrile was changed to 9 parts. Moreover, measurements and evaluations were carried out in the same way as in Example 1. The results are shown in Table 1.

Example 10

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, 0.4 parts of t-dodecyl mercaptan (TDM) was added as a chain transfer agent and the weight average molecular weight of the polymer was adjusted to a value shown in Table 1. Moreover, measurements and evaluations were carried out in the same way as in Example 1. The results are shown in Table 1.

Example 11

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, the amount of 2-ethylhexyl acrylate was changed to 56.8 parts, 0.2 parts of allyl methacrylate was added as another monomer, and the weight average molecular weight of the polymer was adjusted to a value shown in Table 1. Moreover, measurements and evaluations were carried out in the same way as in Example 1. The results are shown in Table 1.

Example 12

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, the amount of 2-ethylhexyl acrylate was changed to 55 parts, the amount of styrene was changed to 35 parts, and 5 parts of 1,3-butadiene was added as another monomer. Moreover, measurements and evaluations were carried out in the same way as in Example 1. The results are shown in Table 1.

Example 13

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, the amount of 2-ethylhexyl acrylate was changed to 56.5 parts and 0.5 parts of methacrylic acid was added as another monomer. Moreover, measurements and evaluations were carried out in the same way as in Example 1. The results are shown in Table 1.

Comparative Example 1

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, the amount of 2-ethylhexyl acrylate was changed to 72 parts, the amount of styrene was changed to 25 parts, and the amount of acrylonitrile was changed to 3 parts. Moreover, measurements and evaluations were carried out in the same way as in Example 1. The results are shown in Table 1.

Comparative Example 2

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, the amount of 2-ethylhexyl acrylate was changed to 35 parts and the amount of styrene was changed to 60 parts. Moreover, measurements and evaluations were carried out in the same way as in Example 1. The results are shown in Table 1.

Comparative Example 3

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, the amount of 2-ethylhexyl acrylate was changed to 60 parts, the amount of styrene was changed to 40 parts, and acrylonitrile was not used (i.e., the amount of acrylonitrile was changed to 0 parts). Moreover, measurements and evaluations were carried out in the same way as in Example 1. The results are shown in Table 1.

Comparative Example 4

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, the amount of 2-ethylhexyl acrylate was changed to 52 parts, the amount of styrene was changed to 33 parts, and the amount of acrylonitrile was changed to 15 parts. Moreover, measurements and evaluations were carried out in the same way as in Example 1. The results are shown in Table 1.

Comparative Example 5

A water dispersion of a polymer, an 8 mass % NMP solution of the polymer, a slurry for a positive electrode, a slurry for a negative electrode, a positive electrode, a negative electrode, and a secondary battery were produced in the same way as in Example 1 with the exception that in production of the polymer, the amount of 2-ethylhexyl acrylate was changed to 65 parts, the amount of acrylonitrile was changed to 10 parts, styrene was not used (i.e., the amount of styrene was changed to 0 parts), and 25 parts of 1,3-butadiene was added as another monomer. Moreover, measurements and evaluations were carried out in the same way as in Example 1. The results are shown in Table 1.

In Table 1, shown below:

"2-EHA" indicates 2-ethylhexyl acrylate;

"ST" indicates styrene;

"AN" indicates acrylonitrile;

"AMA" indicates allyl methacrylate;

"BD" indicates 1,3-butadiene; and

"MAA" indicates methacrylic acid.

TABLE 1

| | | | | Example 1 | Example 2 | Example 3 | Example 4 | Example 5 |
|---|---|---|---|---|---|---|---|---|
| Slurry for non-aqueous secondary battery electrode | Binder for non-aqueous secondary battery electrode | Polymer | Structural unit (a) derived from monofunctional ethylenically unsaturated carboxylic acid ester monomer (2-EHA) [mass %] | 57 | 62 | 52 | 57 | 56.9 |
| | | | Structural unit (b) derived from aromatic vinyl monomer (ST) [mass %] | 38 | 33 | 43 | 38 | 38 |
| | | | Structural unit (c) derived from ethylenically unsaturated nitrile monomer (AN) [mass %] | 5 | 5 | 5 | 5 | 5 |
| | | | Structural units derived from other monomers   Type | — | — | — | — | AMA |
| | | |                                                 [Mass %] | 0 | 0 | 0 | 0 | 0.1 |
| | | | Total percentage content of (a), (b), and (c) [mass %] | 100 | 100 | 100 | 100 | 99.9 |
| | | | Solubility parameter $SP_p$ [MPa$^{1/2}$] | 19.2 | 19.2 | 19.3 | 19.2 | 19.2 |
| | | | Weight average molecular weight [×10$^4$] | 30 | 30 | 30 | 8 | 60 |
| | | | Glass transition temperature [° C.] | −15 | −22 | −8 | −15 | −15 |
| | | | Amount [parts by mass] | 1.2 | 1.2 | 1.2 | 1.2 | 1.2 |
| | | Amount of positive electrode active material [parts by mass] | | 100 | 100 | 100 | 100 | 100 |
| | | Amount of conductive material [parts by mass] | | 1.5 | 1.5 | 1.5 | 1.5 | 1.5 |
| | Evaluations | Swelling rate in electrolysis solution of polymer | | A | A | A | A | A |
| | | Percentage of insoluble content of polymer | | A | A | A | A | B |
| | | Dispersibility of slurry for electrode | | A | B | A | A | B |
| | | Flexibility of electrode | | A | A | B | A | A |
| | | Binding capacity of electrode | | A | A | A | B | A |
| | | Output characteristics of secondary battery | | A | B | B | A | B |
| | | High-temperature cycle characteristics of secondary battery | | A | B | B | B | B |

| | | | | Example 6 | Example 7 | Example 8 | Example 9 | Example 10 |
|---|---|---|---|---|---|---|---|---|
| Slurry for non-aqueous secondary battery electrode | Binder for non-aqueous secondary battery electrode | Polymer | Structural unit (a) derived from monofunctional ethylenically unsaturated carboxylic acid ester monomer (2-EHA) [mass %] | 67 | 47 | 59 | 55 | 57 |
| | | | Structural unit (b) derived from aromatic vinyl monomer (ST) [mass %] | 30 | 48 | 39.5 | 36 | 38 |
| | | | Structural unit (c) derived from ethylenically unsaturated nitrile monomer (AN) [mass %] | 3 | 5 | 1.5 | 9 | 5 |
| | | | Structural units derived from other monomers   Type | — | — | — | — | — |
| | | |                                                 [Mass %] | 0 | 0 | 0 | 0 | 0 |
| | | | Total percentage content of (a), (b), and (c) [mass %] | 100 | 100 | 100 | 100 | 100 |
| | | | Solubility parameter $SP_p$ [MPa$^{1/2}$] | 19.1 | 19.3 | 19.0 | 19.5 | 19.2 |
| | | | Weight average molecular weight [×10$^4$] | 30 | 30 | 30 | 30 | 6 |
| | | | Glass transition temperature [° C.] | −29 | −1 | −19 | −12 | −15 |
| | | | Amount [parts by mass] | 1.2 | 1.2 | 1.2 | 1.2 | 1.2 |
| | | Amount of positive electrode active material [parts by mass] | | 100 | 100 | 100 | 100 | 100 |
| | | Amount of conductive material [parts by mass] | | 1.5 | 1.5 | 1.5 | 1.5 | 1.5 |
| | Evaluations | Swelling rate in electrolysis solution of polymer | | A | A | A | C | A |
| | | Percentage of insoluble content of polymer | | B | A | C | A | A |
| | | Dispersibility of slurry for electrode | | C | A | C | A | A |
| | | Flexibility of electrode | | A | C | A | A | A |
| | | Binding capacity of electrode | | A | A | C | A | C |
| | | Output characteristics of secondary battery | | C | C | C | C | A |
| | | High-temperature cycle characteristics of secondary battery | | C | C | C | C | C |

| | | | | Example 11 | Example 12 | Example 13 | Comparative Example 1 | Comparative Example 2 |
|---|---|---|---|---|---|---|---|---|
| Slurry for non-aqueous secondary battery electrode | Binder for non-aqueous secondary battery electrode | Polymer | Structural unit (a) derived from monofunctional ethylenically unsaturated carboxylic acid ester monomer (2-EHA) [mass %] | 56.8 | 55 | 56.5 | 72 | 35 |
| | | | Structural unit (b) derived from aromatic vinyl monomer (ST) [mass %] | 38 | 35 | 38 | 25 | 60 |
| | | | Structural unit (c) derived from ethylenically unsaturated nitrile monomer (AN) [mass %] | 5 | 5 | 5 | 3 | 5 |

TABLE 1-continued

|  |  |  |  |  |  |  |  |  |
|---|---|---|---|---|---|---|---|---|
|  |  | Structural units derived from other monomers | Type<br>[Mass %] | AMA<br>0.2 | BD<br>5 | MMA<br>0.5 | —<br>0 | —<br>0 |
|  |  | Total percentage content of (a), (b), and (c) [mass %] |  | 99.8 | 95 | 99.5 | 100 | 100 |
|  |  | Solubility parameter $SP_p$ [MPa$^{1/2}$] |  | 19.2 | 19.2 | 19.2 | 19.0 | 19.4 |
|  |  | Weight average molecular weight [×10$^4$] |  | 90 | 30 | 30 | 30 | 30 |
|  |  | Glass transition temperature [° C.] |  | −15 | −17 | −14 | −35 | 20 |
|  |  | Amount [parts by mass] |  | 1.2 | 1.2 | 1.2 | 1.2 | 1.2 |
|  | Amount of positive electrode active material [parts by mass] |  |  | 100 | 100 | 100 | 100 | 100 |
|  | Amount of conductive material [parts by mass] |  |  | 1.5 | 1.5 | 1.5 | 1.5 | 1.5 |
| Evaluations | Swelling rate in electrolysis solution of polymer |  |  | A | B | A | A | B |
|  | Percentage of insoluble content of polymer |  |  | C | A | A | C | A |
|  | Dispersibility of slurry for electrode |  |  | C | A | C | D | A |
|  | Flexibility of electrode |  |  | A | A | A | A | D |
|  | Binding capacity of electrode |  |  | A | A | A | A | A |
|  | Output characteristics of secondary battery |  |  | C | B | C | D | D |
|  | High-temperature cycle characteristics of secondary battery |  |  | C | C | C | D | D |

|  |  |  |  |  | Comparative Example 3 | Comparative Example 4 | Comparative Example 5 |
|---|---|---|---|---|---|---|---|
| Slurry for non-aqueous secondary battery electrode | Binder for non-aqueous secondary battery electrode | Polymer | Structural unit (a) derived from monofunctional ethylenically unsaturated carboxylic acid ester monomer (2-EHA) [mass %] |  | 60 | 52 | 65 |
|  |  |  | Structural unit (b) derived from aromatic vinyl monomer (ST) [mass %] |  | 40 | 33 | 0 |
|  |  |  | Structural unit (c) derived from ethylenically unsaturated nitrile monomer (AN) [mass %] |  | 0 | 15 | 10 |
|  |  |  | Structural units derived from other monomers | Type<br>[Mass %] | —<br>0 | —<br>0 | BD<br>25 |
|  |  |  | Total percentage content of (a), (b), and (c) [mass %] |  | 100 | 100 | 75 |
|  |  |  | Solubility parameter $SP_p$ [MPa$^{1/2}$] |  | 18.9 | 19.8 | 19.3 |
|  |  |  | Weight average molecular weight [×10$^4$] |  | 30 | 30 | 30 |
|  |  |  | Glass transition temperature [° C.] |  | −23 | −7 | −59 |
|  |  |  | Amount [parts by mass] |  | 1.2 | 1.2 | 1.2 |
|  |  | Amount of positive electrode active material [parts by mass] |  |  | 100 | 100 | 100 |
|  |  | Amount of conductive material [parts by mass] |  |  | 1.5 | 1.5 | 1.5 |
|  | Evaluations | Swelling rate in electrolysis solution of polymer |  |  | A | D | C |
|  |  | Percentage of insoluble content of polymer |  |  | D | A | A |
|  |  | Dispersibility of slurry for electrode |  |  | D | B | D |
|  |  | Flexibility of electrode |  |  | A | B | A |
|  |  | Binding capacity of electrode |  |  | D | A | A |
|  |  | Output characteristics of secondary battery |  |  | D | D | D |
|  |  | High-temperature cycle characteristics of secondary battery |  |  | D | D | D |

It can be seen from Table 1 that in Examples 1 to 13 in which polymers that included structural units (a), (b), and (c) in the prescribed proportions were used, secondary battery output characteristics and high-temperature cycle characteristics were remarkably improved relative to Comparative Examples 1 to 5 in which polymers that did not include structural units (a), (b), and (c) in the prescribed proportions were used.

Specifically, it can be seen from Table 1 that in Comparative Example 1 in which a structural unit (a) was used in a larger proportion than prescribed and a structural unit (b) was used in a smaller proportion than prescribed, dispersibility of the slurry for an electrode decreased, and output characteristics and high-temperature cycle characteristics (battery characteristics) of the secondary battery deteriorated. In Comparative Example 2 in which a structural unit (a) was used in a smaller proportion than prescribed and a structural unit (b) was used in a larger proportion than prescribed, flexibility of the electrode decreased, and the aforementioned battery characteristics deteriorated. In Comparative Example 3 in which a structural unit (c) was not used, the percentage of insoluble content of the polymer increased, dispersibility of the slurry for an electrode and binding capacity of the electrode decreased, and the aforementioned battery characteristics deteriorated. In Comparative Example 4 in which a structural unit (c) was used in a larger proportion than prescribed, the swelling rate in electrolyte solution of the polymer increased, and the aforementioned battery characteristics deteriorated. In Comparative Example 5 in which a structural unit (b) was not used, the swelling rate in electrolyte solution of the polymer increased, dispersibility of the slurry for an electrode decreased, and the aforementioned battery characteristics deteriorated.

INDUSTRIAL APPLICABILITY

According to the present disclosure, it is possible to provide a slurry for an electrode that has excellent dispersibility and can cause a secondary battery to display excellent output characteristics and high-temperature cycle characteristics, and to provide a binder for an electrode that enables production of this slurry for an electrode.

Moreover, according to the present disclosure, it is possible to provide a secondary battery having excellent output characteristics and high-temperature cycle characteristics, and an electrode that enables production of this secondary battery.

The invention claimed is:

1. A binder for a non-aqueous secondary battery electrode comprising a polymer and an organic solvent, wherein
the polymer includes:
a structural unit (a) derived from a monofunctional ethylenically unsaturated carboxylic acid ester monomer in a proportion of at least 45 mass % and not more than 69.9 mass %, wherein the monofunctional ethylenically unsaturated carboxylic acid ester monomer is an acrylic acid alkyl ester in which the alkyl portion of the carboxylic acid ester has a carbon number of 4 or more;
a structural unit (b) derived from an aromatic vinyl monomer in a proportion of at least 30 mass % and not more than 54.9 mass %; and
a structural unit (c) derived from an ethylenically unsaturated nitrile monomer in a proportion of at least 0.1 mass % and not more than 10 mass %,
wherein the polymer has a weight average molecular weight of at least $7.5 \times 10^4$ and not more than $100 \times 10^4$,
wherein the polymer has a swelling rate in electrolyte solution of at least 100% and not more than 300%, and
wherein the glass transition temperature of the polymer is 0° C. or lower.

2. The binder for a non-aqueous secondary battery electrode according to claim 1, wherein
total percentage content of the structural unit (a), the structural unit (b), and the structural unit (c) is 90 mass % or more relative to all structural units included in the polymer.

3. The binder for a non-aqueous secondary battery electrode according to claim 1, wherein
the polymer has a solubility parameter of at least 19.0 $MPa^{1/2}$ and not more than 19.6 $MPa^{1/2}$.

4. A slurry for a non-aqueous secondary battery electrode comprising:
an electrode active material; and
the binder for a non-aqueous secondary battery electrode according to claim 1.

5. The slurry for a non-aqueous secondary battery electrode according to claim 4, further comprising a conductive material.

6. An electrode for a non-aqueous secondary battery comprising:
a current collector; and
an electrode mixed material layer formed using the slurry for a non-aqueous secondary battery electrode according to claim 4.

7. A non-aqueous secondary battery comprising a positive electrode, a negative electrode, a separator, and an electrolyte solution, wherein
at least one of the positive electrode and the negative electrode is the electrode for a non-aqueous secondary battery according to claim 6.

* * * * *